United States Patent [19]

Drew

[11] Patent Number: 5,655,999

[45] Date of Patent: Aug. 12, 1997

[54] MULTI-PURPOSE PLIABLE SUPPORT APPARATUS

[76] Inventor: Stephenie M. Drew, 3728 Normandy, Dallas, Tex. 75205

[21] Appl. No.: 402,875

[22] Filed: Mar. 13, 1995

[51] Int. Cl.[6] .................................................. A63B 21/00
[52] U.S. Cl. .................................. 482/52; 482/148
[58] Field of Search ........................ 248/215, 302, 248/303, 305, 505; 224/42.01, 485, 30 A, 42; 280/288.4; 446/374; 482/148, 51, 52; D21/191

[56] References Cited

U.S. PATENT DOCUMENTS

| | | | |
|---|---|---|---|
| 599,120 | 2/1898 | Coolidge | 224/30 A |
| 1,155,296 | 9/1915 | Beuther | 24/343 |
| 3,175,793 | 3/1965 | Kennedy | 248/302 |
| 3,532,225 | 10/1970 | Reed | 211/181 |
| 4,367,572 | 1/1983 | Zielenski | 248/505 |
| 4,566,666 | 1/1986 | Meska et al. | |
| 5,232,189 | 8/1993 | Koch | 248/302 |
| 5,450,993 | 9/1995 | Guerrero et al. | 248/505 |

*Primary Examiner*—Jerome Donnelly
*Attorney, Agent, or Firm*—Fulbright & Jaworski L.L.P.

[57] ABSTRACT

A pliable support apparatus that can be hand-bent to assume various desired three-dimensional shapes to support or enclose objects in a non-slip manner. The apparatus can be used to support an appliance such as a portable music player, while allowing the user to keep his or her hands free. The apparatus forms a continuous shape and is made of pliable, resilient material that can be hand-bent to hang from exercise equipment and firmly support the music player during exercise. Alternatively, the apparatus can be hand-bent to stand freely on a flat surface and support the music player near where the user is exercising. It can be adapted as necessary to conform to and accommodate the shape of the device it is supporting, yet is rigid enough to resist deformity under the weight of the device. The apparatus features a non-slip, resilient outer surface. An optional strap is available to secure the device to the apparatus before or after bending if desired. Although the preferred embodiment is directed to use while exercising, the apparatus could be used and reused to support or hang many different objects in wider applications.

1 Claim, 5 Drawing Sheets

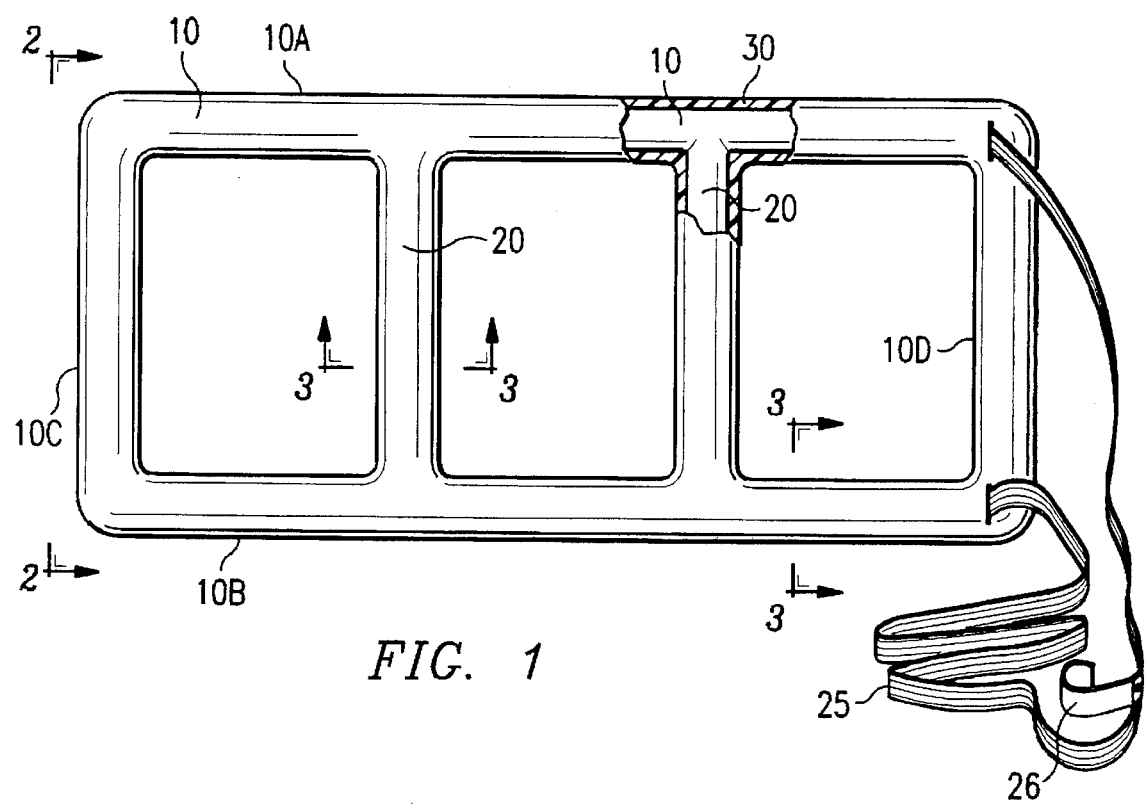
FIG. 1
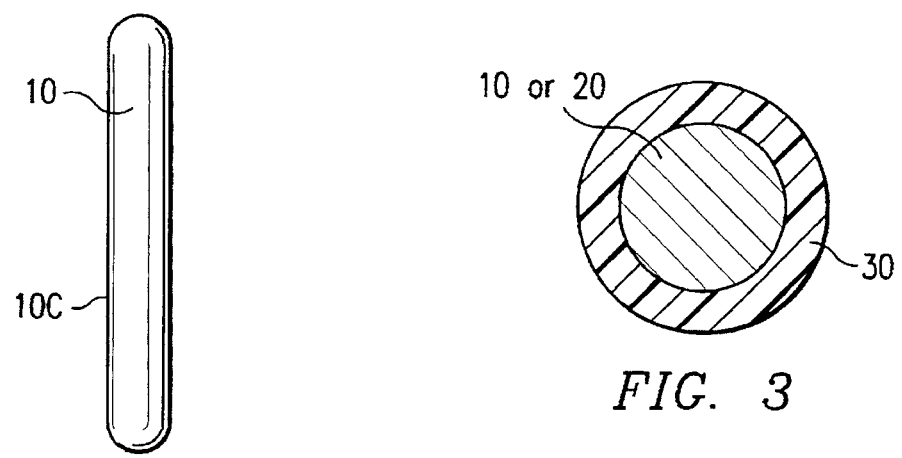
FIG. 2
FIG. 3

MULTI-PURPOSE PLIABLE SUPPORT APPARATUS

BACKGROUND OF THE INVENTION

This invention relates to exercise accessories and in particular to a pliable apparatus that can be used in a variety of circumstances to support an appliance such as a portable cassette player or compact disc player, while allowing the exerciser to keep his or her hands free. Since the 1980s there has been substantial growth in the health and fitness industry as increasing numbers of people choose to exercise on a regular basis. Of particular popularity is the use of stationary equipment such as treadmills, stair machines, cycles, and rowing machines, which allow the exerciser to participate in aerobic exercise in a controlled environment, such as at home, at a health club or at a fitness center.

Many exercisers prefer to listen to music privately while exercising on such equipment, usually via a portable cassette or compact disc player with an attached set of earphones, generically known as a "walkman." There has been a long-felt but unsolved need for a hands-free means of supporting such a device while exercising. Free hands are important for operating and controlling the exercise equipment, maintaining one's balance, and maintaining comfort and safety. Some exercisers attach their music players to a strap worn around the waist or around an arm, but having such an object attached to the body while exercising can be uncomfortable and can impede the exercise. Other exercisers choose to hold their music players in one of their hands which makes it difficult to stay balanced and can cause discomfort in the hand or arm. The present invention addresses this need by providing a simple and flexible apparatus made of pliable, resilient material that can be hand-bent to hang from the exercise equipment and firmly support the music player during exercise. The open-frame design of the invention allows unimpeded operation of the exercise equipment even if the apparatus hangs over the display monitor of the equipment. Alternatively, the present invention can be hand-bent to stand freely on a flat surface and support the music player near where the user is exercising. It can be adapted as necessary to conform to and accommodate the shape of the music player, yet is rigid enough to resist deformity under the weight of the music player. The design is also rigid enough to resist deformity when the exerciser operates the music player by pushing buttons or moving controls. An optional strap with fastener means, such as a hook, is available to retain the music player securely within the apparatus during use. Although the preferred embodiment is directed to use while exercising, the apparatus could be used and reused to support or hang many different objects in wider applications.

Bracket and support devices are known in the prior art, but are distinguishable from the present invention. Further, the present invention discloses unsuggested combinations of modifications from the prior art, thereby advancing an otherwise crowded art. For example, Meska, U.S. Pat. No. 4,566,666, discloses a malleable wire bracket for mounting small appliances to a wall that is attached to the wall via an electrical outlet, a screw, or a pegboard, and presents two separate, unconnected wire members on which to hang appliances. Unlike Meska, the present invention can be free-standing, is stronger through being a continuous shape, and does not require an independent means of attachment to a vertical surface. Koch, U.S. Pat. No. 5,232,189, discloses a soap holder made of pliable wire that attaches to a sink or wall with two suction cups. Koch is distinguishable from the present invention in that it has no ability to adapt to the shape of the device it is holding, is intended for a different purpose, cannot be free-standing, and whose suction-cup separate means of attachment suggest minimal utility on exercise machines. A different use of pliable wire is disclosed in Reed, U.S. Pat. No. 3,532,225, which is a free-standing geometric structure convertible into different geometric shapes. Reed is distinguishable from the present invention in that it also has no ability to adapt to the shape of the device it is holding, is intended for different purposes, and suggests minimal utility on exercise machines.

SUMMARY OF THE INVENTION

As noted, one object of this invention is to provide a sturdy apparatus to support or hang different objects such as music players used by exercisers.

Again as noted, another object of this invention is to provide a pliable apparatus that will conform to the shape of the device which it supports.

A further object of this invention is to provide a pliable support apparatus that will hold a portable music player in such a way as to enable an exerciser to privately listen to music while keeping his or her hands free.

A further object of this invention is to provide a pliable support apparatus that will hold securely a portable music player in such a way as to enable an exerciser to operate the controls of the music player without interrupting his or her exercise.

A further object of this invention is to provide a pliable support apparatus with a non-slip outer surface.

A further object of this invention is to provide a pliable support apparatus that is adaptable to a variety of situations.

A further object of this invention is to provide a pliable support apparatus that is easy and convenient to use, and easy to manufacture.

These and other objects of the present invention will be apparent to those skilled in this art from the detailed description of a preferred embodiment of the invention set forth below.

BRIEF DESCRIPTION OF THE DRAWINGS

This invention will be further described in connection with the accompanying drawings, in which:

FIG. 1 is an overhead view of the present invention showing its general shape when lying flat. A portion cut away in FIG. 1 shows a typical connection of a cross-brace 20 to long sides 10A and 10B underneath wrapping 30. FIG. 1 also shows optional strap 25 with fastener means 26 attached to long side 10D.

FIG. 2 is a side view of the short side of the present invention as shown on FIG. 1.

FIG. 3 is a typical enlarged sectional view through the present invention, also as shown on FIG. 1, illustrating the ductile frame and its wrapping.

FIG. 4A shows the present invention supporting a portable music player from the handrail of a stair machine. Optional strap 25 has been omitted for clarity. FIG. 4B is similar view to FIG. 4A, except that in FIG. 4B the present invention supports the portable music player from the control console. FIG. 4B also shows optional strap 25 with fastener means 26 seeing the portable music player to the invention. FIG. 4C shows the present invention hanging from the handrail of a treadmill, waiting to receive an object such as a portable music player. Optional strap 25 with fastener means 26 is also available to secure the object to the invention.

DETAILED DESCRIPTION OF THE INVENTION

Figure 4A:
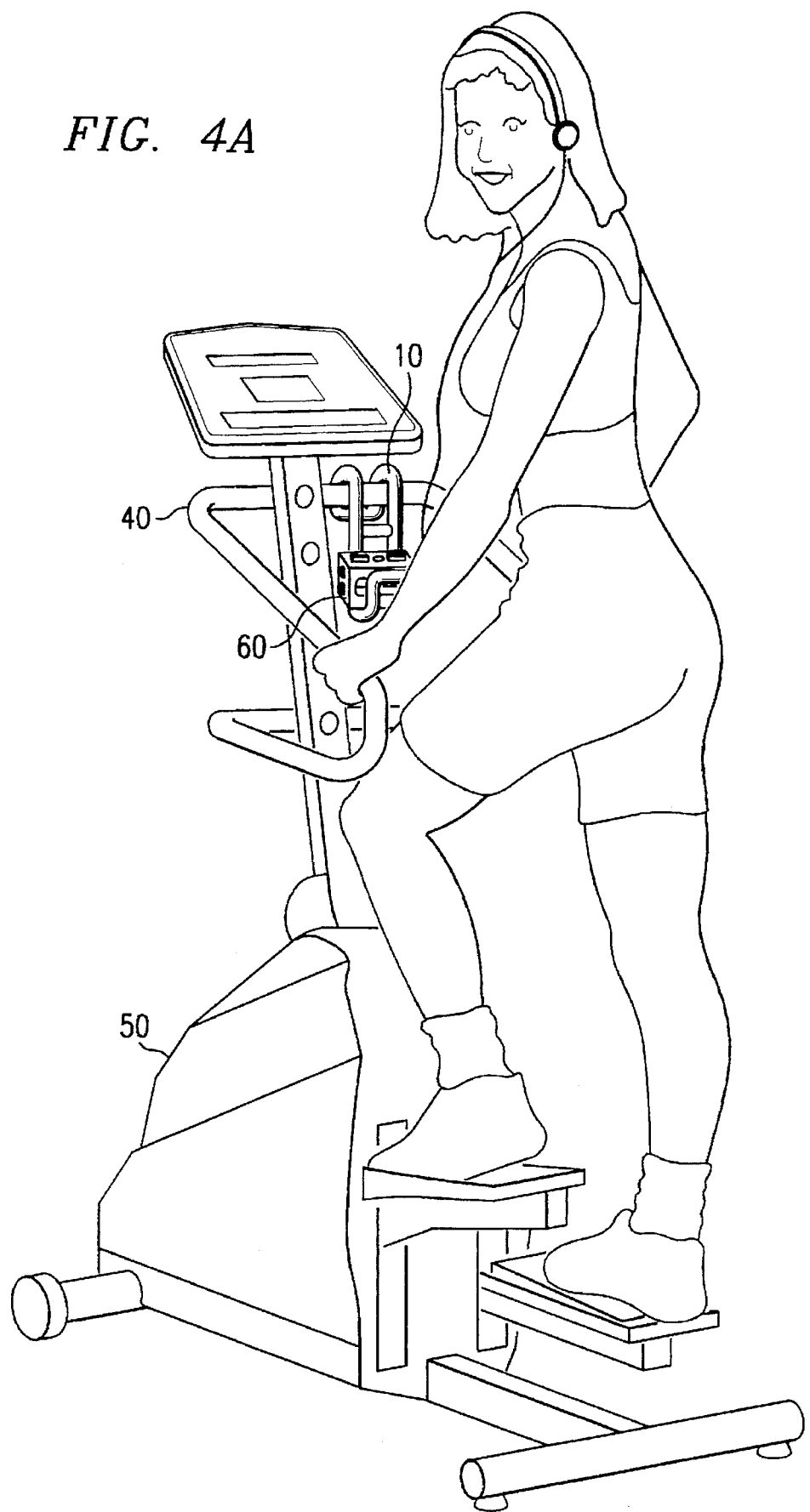
FIGS. 4A, 4B, and 4C are perspective views of the present invention, showing it bent to support a portable music player from convenient locations on exercise equipment.

As shown on FIG. 1, frame 10 includes long sides 10A and 10B and short sides 10C and 10D. Frame 10 also includes two identical cross-braces 20, which connect long sides 10A and 10B. Optional strap 25 attaches to frame 10, preferably to one of short sides 10C or 10D, and is available to secure objects to frame 10 as described in greater detail below. Optional strap 25 may also provide fastener means 26, such as a hook, to assist in securing objects to frame 10. FIG. 1 shows a preferred embodiment with optional strap 25 and fastener means 26 attached to frame 10 at long side 10D.

As shown on FIG. 2, in the unbent position, frame 10 and cross-braces 20 are generally planar.

As shown on FIG. 1 and FIG. 3, wrapping 30 completely encases the outer surfaces of frame 10 and cross-braces 20. Frame 10 will be made of a ductile material such as wire, and wrapping 30 will be made of a waterproof, non-slip material such as neoprene.

Figure 4B:
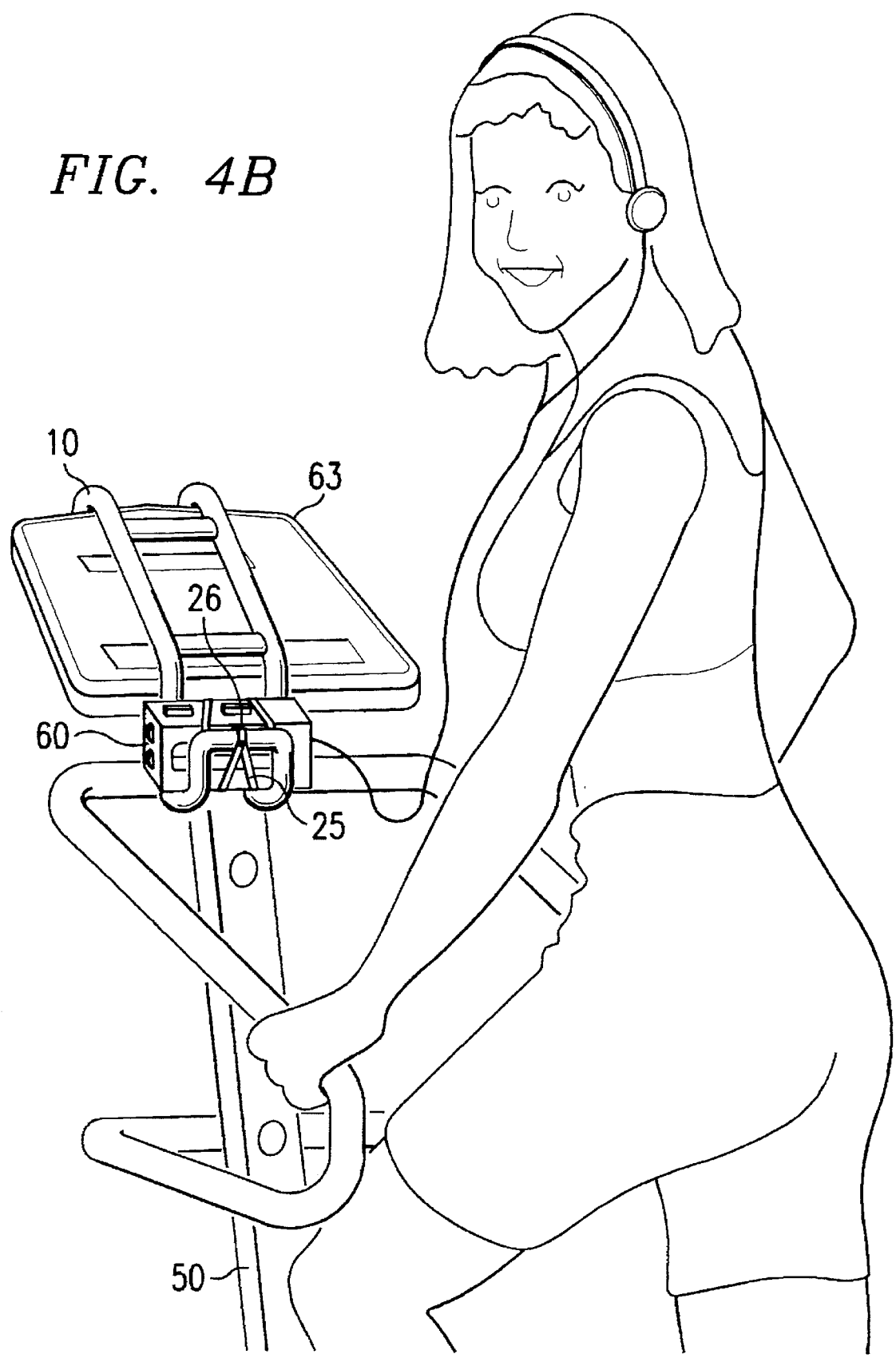
Figure 4C:
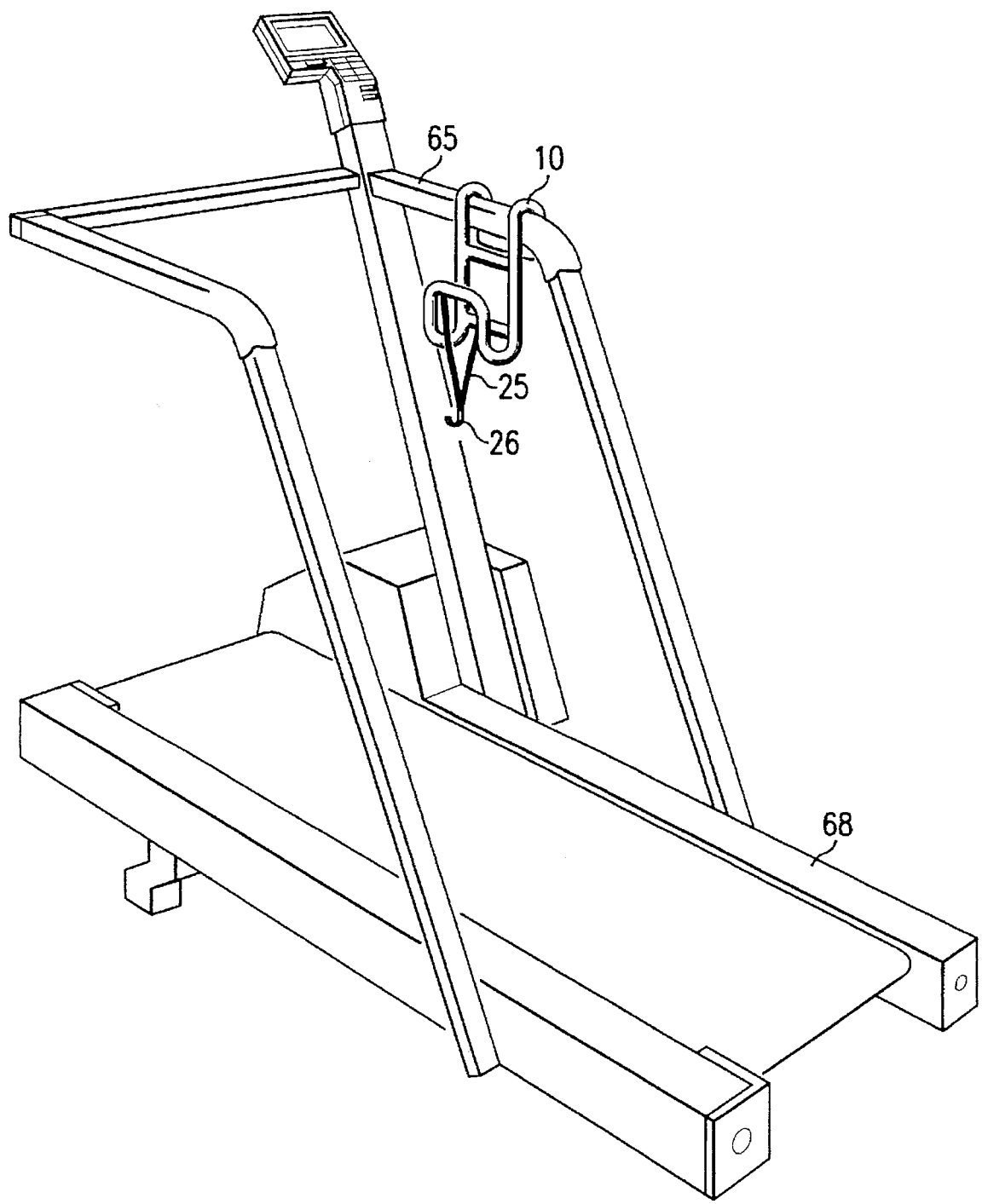

One of the major advantages of this apparatus is that it may be bent to conform to and accommodate the shape of the object it supports without deforming under the weight of the object. FIG. 4A depicts an application of the invention adapted to hang without failing from the handrail 40 of stair machine 50 while holding portable music player 60 securely. This application permits the exerciser to free his or her hands of portable music player 60 to operate stair machine 50 while maintaining balance. Optional strap 25 is omitted from FIG. 4A for clarity. FIG. 4B depicts the invention supporting portable music player 60 from the control console 63 of stair machine 50. FIG. 4B also depicts optional strap 25 with fastener means 26 securing music player 60 to frame 10. In a third, similar application, FIG. 4C depicts the present invention hanging from handrail 65 of treadmill 68, the invention ready to receive an object such as a portable music player. Optional strap 25 with fastener means 26 are also depicted in FIG. 4C, available to secure the object to frame 10 once received therein.

Figure 5:
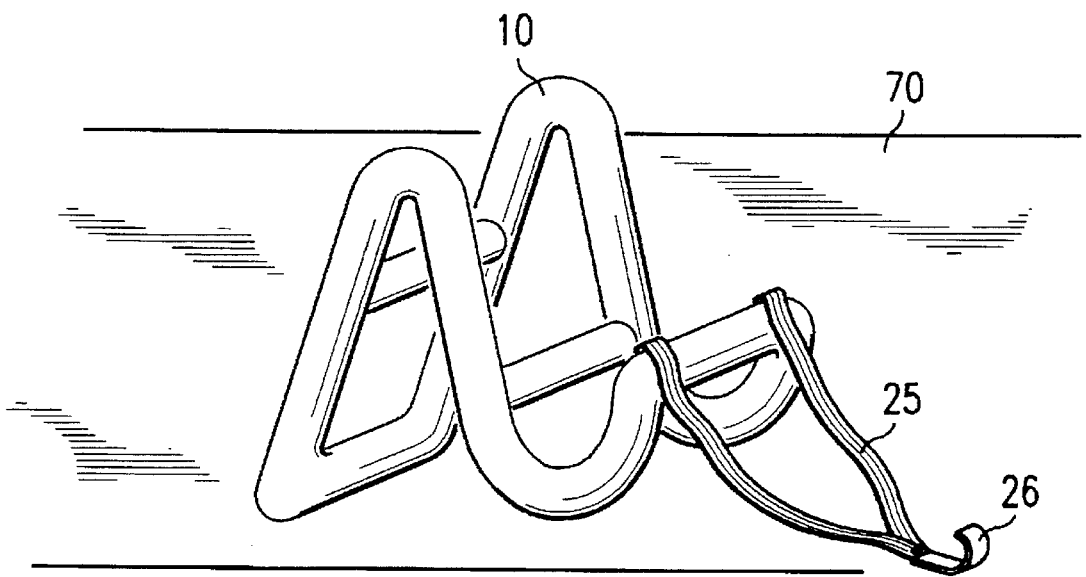
FIG. 5 is another perspective view of the present invention, this time showing it bent to receive a portable music player upright on a flat surface.

Another advantage of this apparatus is that it may be used in a free-standing application. FIG. 5 depicts an adaptation of the invention wherein two bends are made to frame 10 in order to enable it to stand freely on flat surface 70 while waiting to receive a small appliance such as a portable music player. The user has the flexibility of adjusting the angle and size of the bends in frame 10 depending upon the weight and size of the appliance being used. This adaptation might be employed when the user is exercising on the floor or relaxing poolside and wishes to keep his or her hands free and the small appliance upright and dry.

Figure 6:
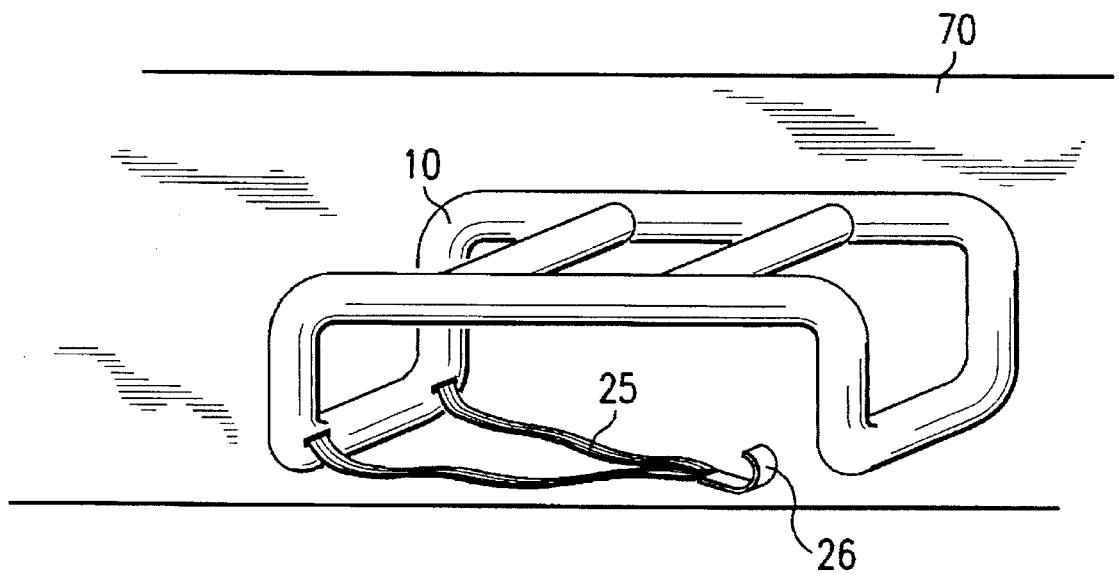
FIG. 6 is a further perspective view of the present invention, this time showing it bent to receive a portable music player elevated above a flat surface.

Another free-standing adaptation of this apparatus is shown in FIG. 6, in which two ninety-degree bends are made to frame 10 in order to elevate a small appliance such as a portable music player above flat surface 70. This adaptation provides similar benefits to those of the adaptation depicted in FIG. 5. Those of skill in this art will realize that many other adaptations are possible, as the user can bend and rebend frame 10 to conform to the shape of the object being supported and the constraints presented by the activity in which the user is engaged.

The invention has been shown, described, and illustrated in substantial detail with reference to a presently preferred embodiment. However, it will be understood by those skilled in the art that changes and modifications may be made without departing from the spirit and scope of the invention which is defined by the claims set forth hereunder.

I claim:

1. A multi-purpose pliable support apparatus, comprising:

a frame, the frame made of a ductile material, the frame having a substantially planar continuous rectangular shape;

the frame having a first long member and a second long member of substantially equal length and two short members of substantially equal length, the first long member and the second long member and the two short members being connected together to form the substantially planar continuous rectangular shape of the frame;

the frame also having at least one cross-brace, each cross-brace having a first end and a second end, the first end of each cross-brace connected to the first long member and the second end of each cross brace connected to the second long member;

a wrapping, the wrapping encasing the frame, the wrapping made from a resilient material of lower ductility than the material from which the frame is made, the wrapping having an outer surface, the outer surface having a non-slip texture; and at least one strap means, each strap means attached to the frame, at least one of the strap means also providing a fastener means suitable to engage the strap means onto the outer surface of the wrapping;

whereby the frame may be bent to assume various desired three-dimensional shapes to support or enclose objects in a non-slip manner, the cross-braces providing the apparatus with improved stability and rigidity, the at least one strap means and the fastener means available to secure the objects to the frame before or after bending.

* * * * *